United States Patent [19]

Rozman et al.

[11] Patent Number: 5,036,451
[45] Date of Patent: Jul. 30, 1991

[54] INVERTER CONTROL WITH INDIVIDUAL PHASE REGULATION

[75] Inventors: Christopher J. Rozman, Park Ridge; Bradley J. Recker; Derrick I. Roe, both of Rockford, all of Ill.

[73] Assignee: Sundstrand Corporation, Arlington Heights, Ill.

[21] Appl. No.: 458,499

[22] Filed: Dec. 28, 1989

[51] Int. Cl.$^5$ ............................................. H02M 1/12
[52] U.S. Cl. .................................... 363/41; 363/98; 364/486
[58] Field of Search .................... 363/41, 97, 98, 132; 318/810, 811; 364/480, 486

[56] References Cited

U.S. PATENT DOCUMENTS

| | | | |
|---|---|---|---|
| 4,447,786 | 5/1984 | Saar et al. | 363/41 |
| 4,520,437 | 5/1985 | Boettcher, Jr. et al. | 363/98 |
| 4,527,226 | 7/1985 | Glennon . | |
| 4,595,976 | 6/1986 | Parro, II . | |
| 4,635,177 | 1/1987 | Shekhawat et al. . | |
| 4,654,773 | 3/1987 | Ito et al. . | |
| 4,656,572 | 4/1987 | Caputo et al. | 363/41 |
| 4,672,285 | 6/1987 | Ito . | |
| 4,729,087 | 3/1988 | Trumpler et al. | 363/98 |
| 4,829,416 | 5/1989 | Inaba et al. | 363/41 |
| 4,849,871 | 7/1989 | Wallingford | 363/41 |

FOREIGN PATENT DOCUMENTS 57-55775 4/1982 Japan .
60-74969 4/1985 Japan .

*Primary Examiner*—Peter S. Wong
*Attorney, Agent, or Firm*—Marshall, O'Toole, Gerstein, Murray & Bicknell

[57] ABSTRACT

An inverter control for an N phase inverter includes a single memory which stores a plurality of bytes, circuitry coupled to the memory for developing a series of memory addresses for each phase output of the inverter, each series of memory addresses defining a phase output waveform to be produced and circuitry coupled to the developing circuitry for accessing the memory with a memory address from each series thereof during each of a number of accessing cycles so that N bytes are provided at an output of the memory during each accessing cycle. A demultiplexer is coupled to the memory for deriving gating signals for switches in the inverter from the bytes provided at the output of the memory.

12 Claims, 6 Drawing Sheets

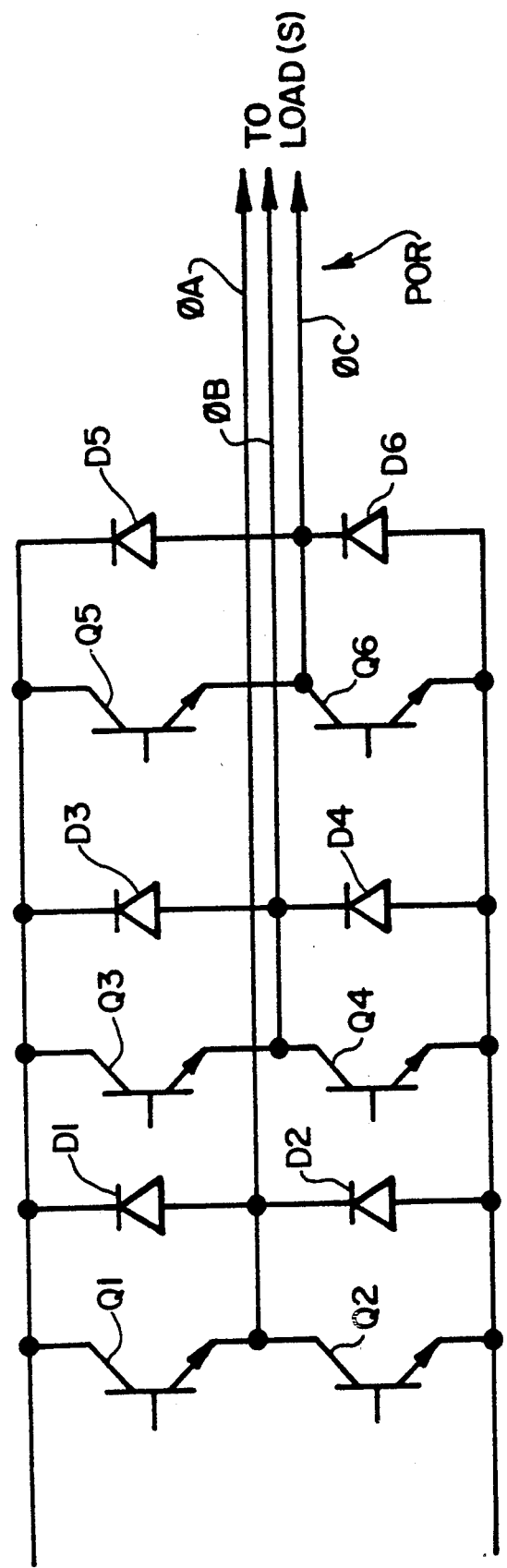
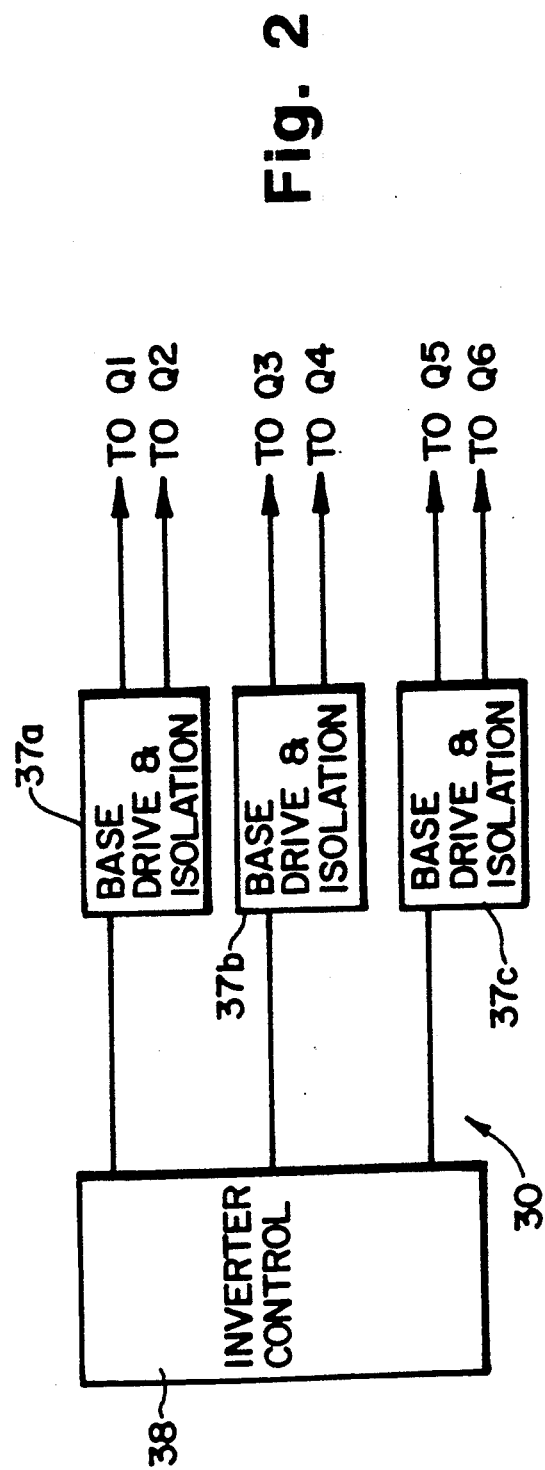
Fig. 2

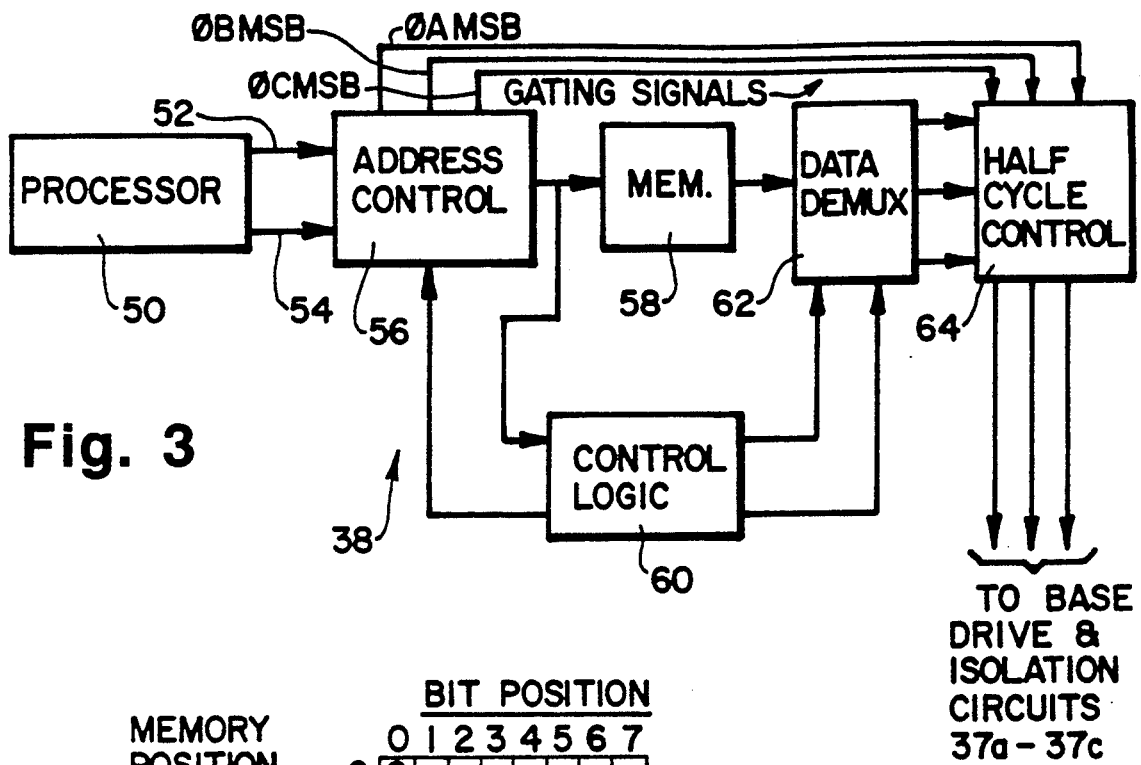

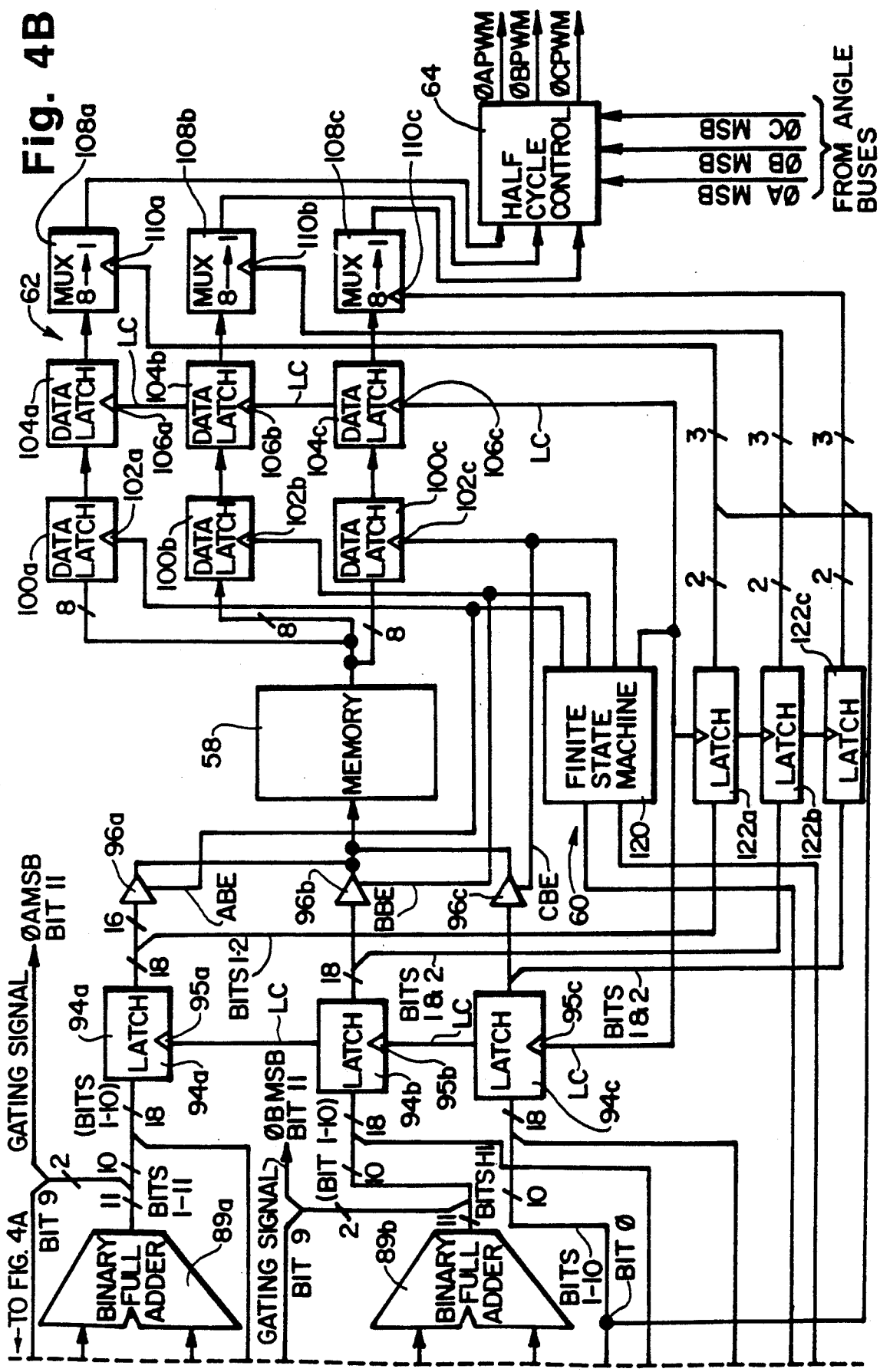

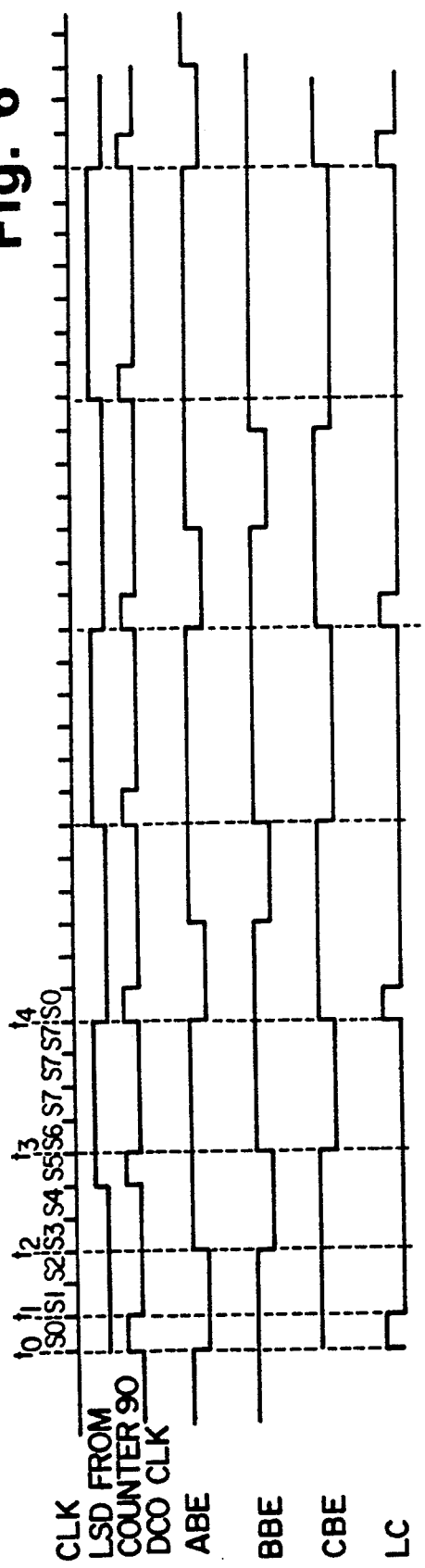
Fig. 6
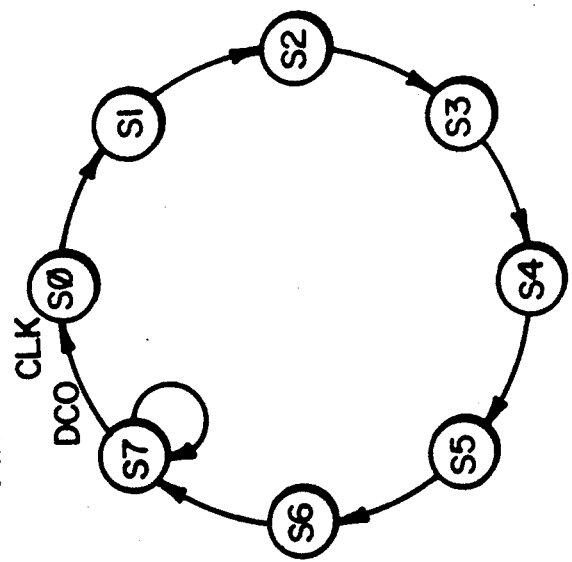
Fig. 8
Fig. 7

INVERTER CONTROL WITH INDIVIDUAL PHASE REGULATION

TECHNICAL FIELD

The present invention relates generally to inverter controls, and more particularly to a control which utilizes stored pulse-width modulated (PWM) waveform patterns.

BACKGROUND ART

Inverters for converting DC power into AC power for AC loads typically include one or more inverter legs, each leg in turn having a pair of controllable switches connected in series across the terminals of a DC power source. The inverter switches, which may be bipolar transistors, insulated gate bipolar transistors (IGBT's) or the like, are operated by an inverter control circuit to produce a PWM output waveform. For a three-phase inverter, the outputs of three inverter legs are typically displaced 120° with respect to one another.

Prior inverter controls have been developed which utilize PWM patterns that are stored in a memory and which are retrieved in accordance with a voltage magnitude command signal and a frequency command signal. Examples of such types of inverter controls are disclosed in Ito, U.S. Pat. No. 4,672,285 and Ito et al., U.S. Pat. No. 4,654,773. In at least the case of the Ito '285 patent, all of the control signals for the inverter legs are derived from a single voltage pattern provided at the output of a read only memory, and hence independent phase voltage regulation is apparently not possible.

Other types of inverter controls have been designed wherein a separate memory is provided for each inverter phase and wherein the memories are separately accessed to allow individual phase voltage regulation. An example of such a control is disclosed in Parro II, U.S. Pat. No. 4,595,976, assigned to the assignee of the instant application and the disclosure of which is expressly incorporated by reference thereto. The Parro inverter control includes 3 memories, each of which stores a plurality of half-cycle PWM waveform patterns. The memories are individually addressed so that appropriate half-cycle PWM control waveforms are obtained for each phase. The half-cycle waveforms are used in conjunction with half-cycle signals to derive the switch control signals required to reproduce an entire cycle of an inverter phase output.

Other types of inverter controls are disclosed in Shekhawat et al., U.S. Pat. No. 4,635,177, Glennon, U.S. Pat. No. 4,527,226 (both of which are assigned to the assignee of instant application), Japanese Patent No. 60-74969 to Tomita and Japanese Patent No. 57-55775 to Maekawa.

SUMMARY OF THE INVENTION

In accordance with the present invention, an inverter control operates switches in a polyphase inverter using PWM waveforms stored in a single memory and includes the capability of individually regulating the inverter phase outputs.

More particularly, an inverter control for developing gating signals for switches in a polyphase inverter to produce N phase outputs where N is an integer greater than one includes a single memory which stores bytes each comprising a number of bits together with means coupled to the memory for developing N series of memory addresses wherein each series defines a phase output waveform to be produced. Means are coupled to the developing means for accessing the memory with a memory address from each series thereof during each of a number of accessing cycles so that N bytes are provided at an output of the memory during each accessing cycle. A demultiplexer is coupled to the memory for deriving the gating signals from the bytes provided at the output of the memory.

In the preferred embodiment, the developing means comprises N pattern selection circuits, each associated with a particular phase output and each of which develops a series of memory addresses. In addition, the accessing means comprises an address multiplexer and the control logic is coupled to the accessing means and the demultiplexer so that the accessing and utilization of data provided at the output of memory are coordinated within each accessing cycle.

The inverter control of the present invention utilizes a single memory yet has the capability of individual phase output regulation. Thus, the control requires less memory than prior controls which are capable of individual phase output regulation.

BRIEF DESCRIPTION OF THE DRAWINGS

FIG. 2 is a simplified combined schematic and block diagram of the inverter and a portion of the control unit illustrated in block diagram form in FIG. 1;

FIG. 3 is a simplified block diagram of the control signal generator illustrated in block diagram form in FIG. 2;

FIGS. 4A and 4B, when joined along the dashed lines with FIG. 4A on the left and FIG. 4B on the right, together comprise a block diagram of the inverter control according to the present invention;

FIG. 5 is a map of a portion of the storage locations in the memory illustrated in FIG. 4B;

FIG. 6 is a series of waveform diagrams illustrating the operation of the inverter control of FIGS. 4A and 4B;

FIG. 7 is a state diagram illustrating the operation of the finite state machine of FIG. 4B; and FIG. 8 is a state table also illustrating the operation of the finite state machine of FIG. 4B.

DESCRIPTION OF THE PREFERRED EMBODIMENT

Figure 1:
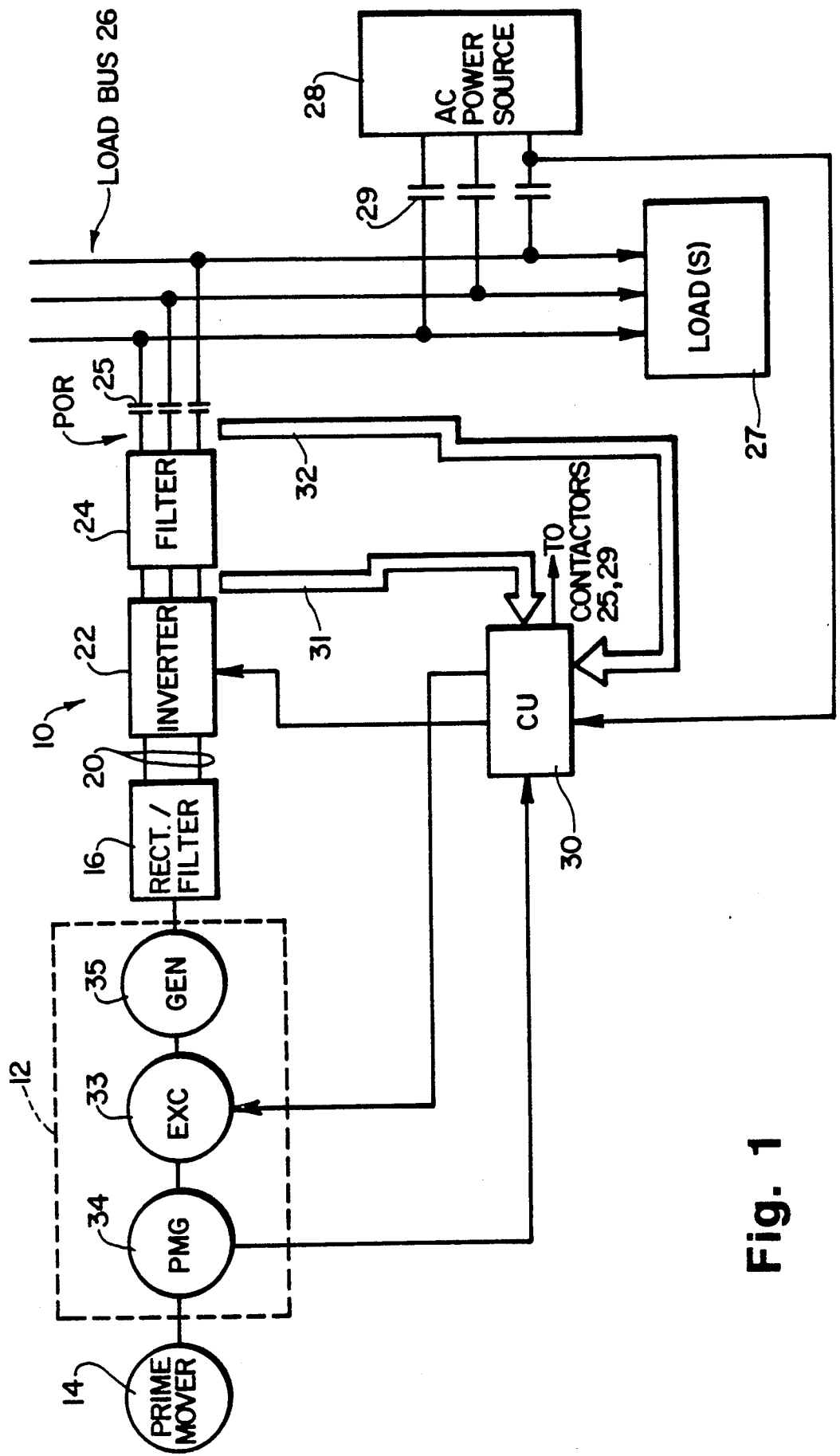
FIG. 1 comprises a block diagram of a variable speed, constant frequency (VSCF) system incorporating an inverter control according to the present invention.

Referring now to FIG. 1, a variable speed, constant frequency (VSCF) system 10 is illustrated. The VSCF system 10 includes a brushless, synchronous generator 12 driven by a variable-speed prime mover 14 which may be, for example, an aircraft jet engine. The generator develops a polyphase, variable-frequency AC output which is converted into DC power by a rectifier/filter 16. The resulting DC power is provided over a DC link 20 to a polyphase inverter 22 which converts the DC power into N phase constant-frequency AC power. This AC power may be filtered by an optional filter 24 and is provided via a set of controllable contactors 25 to a load bus 26. The load bus 26 is, in turn, coupled to one or more loads 27. The load bus 26 may also receive power developed by another AC power source 28 which is coupled thereto through a further set of controllable contactors 29. The AC power source 28 may comprise an external at source, an on-board AC source such as a further VSCF system or the like. It should be noted that the arrangement of contactors shown in FIG. 1 is simplified for ease of understanding.

As seen in FIG. 2, the inverter 22 includes six switches Q1–Q6 which are controlled by a control unit or CU 30. The CU 30 is responsive to output parameters of the inverter 22, as represented by the open arrow 31, as well as to output parameters at a point of regulation (POR), here shown as being at or near the contactors 25, as represented by the open arrow 32. The CU 30 further controls the current delivered to an exciter 33 of the generator 12.

As is conventional, the brushless generator 12 also includes a permanent magnet generator (PMG) 34 which supplies control power to the CU 30 and a main generator portion 35 having armature windings in which the generator power is developed.

In addition to the foregoing functions, the CU 30 also controls the contactors 25 and 29 to in turn couple either or both of the VSCF system 10 and the AC power source 28 to the load bus 26. The CU 30 may be responsive to the power developed on one of the phases of the load bus 26, for example phase C, and further develops a command signal which controls the phase and frequency of the system 10 to control real and reactive power flow between the system 10 and the AC power source 28.

Referring again to FIG. 2, the switches Q1–Q6 of the inverter 22 are connected in a conventional 3-phase bridge configuration together with associated flyback diodes D1–D6. The switches are controlled by base drive signals developed by base drive and isolation circuits 37a–37c. Each base drive and isolation circuit 37a–37c receives a control signal developed by an inverter control 38 which is shown in greater detail and described hereinafter in connection with FIGS. 4A and 4B. Typically, unbalanced load conditions can occur on the load bus 26, in turn leading to unbalanced currents at the output of the inverter 22. In such a case, the filter 24 can cause an undesirable shift away from the required 120° displacement in the output phases. As noted in greater detail hereinafter, the inverter control 38 includes means for maintaining the output phases at the required 120° separation regardless of load conditions.

In addition, the inverter control 38 also regulates individual phase output voltages even during unbalanced load conditions.

Referring now to FIG. 3, there is illustrated in greater detail the inverter control 38 shown in block diagram form in FIG. 2. The inverter control 38 includes a processor 50 which develops signals on microprocessor address and data buses 52, 54. More particularly, the processor 50 develops a series of digital words on the data bus 54 wherein each word comprises a phase voltage command signal representing the voltage magnitude to be produced at an inverter phase output, a frequency command signal representing the desired output frequency of the inverter or a phase displacement command signal representing the desired electrical displacement of two of the phase outputs of the inverter. The processor 50 transmits data over the address bus 52 identifying the nature of each word on the data bus 54 as it is being transmitted thereover. An address control 56 develops a series of memory addresses for each phase output in response to the signals on the buses 52 and 54 wherein each series of memory addresses defines a phase output waveform to be produced. The address control 56 is further responsive to control signals developed by a control logic circuit 60 to access the memory 58 with a memory address from each series of memory addresses during each of a number of accessing cycles whereby a number of bytes equal to the number of output phases of the inverter are provided at the output of the memory 58 during each accessing cycle.

A demultiplexer 62 is coupled to the memory output and is controlled by signals which are synchronized by the control logic 60 to the output of the memory. The demultiplexer produces output signals which are then provided to a half-cycle control circuit 64. Gating signals defining a half-cycle of each phase output are developed by the address control 56 and are provided to the half-cycle control circuit 64 which in turn develops the control signals that are provided to the base drive and isolation circuits 37a–37c.

Figure 4A:
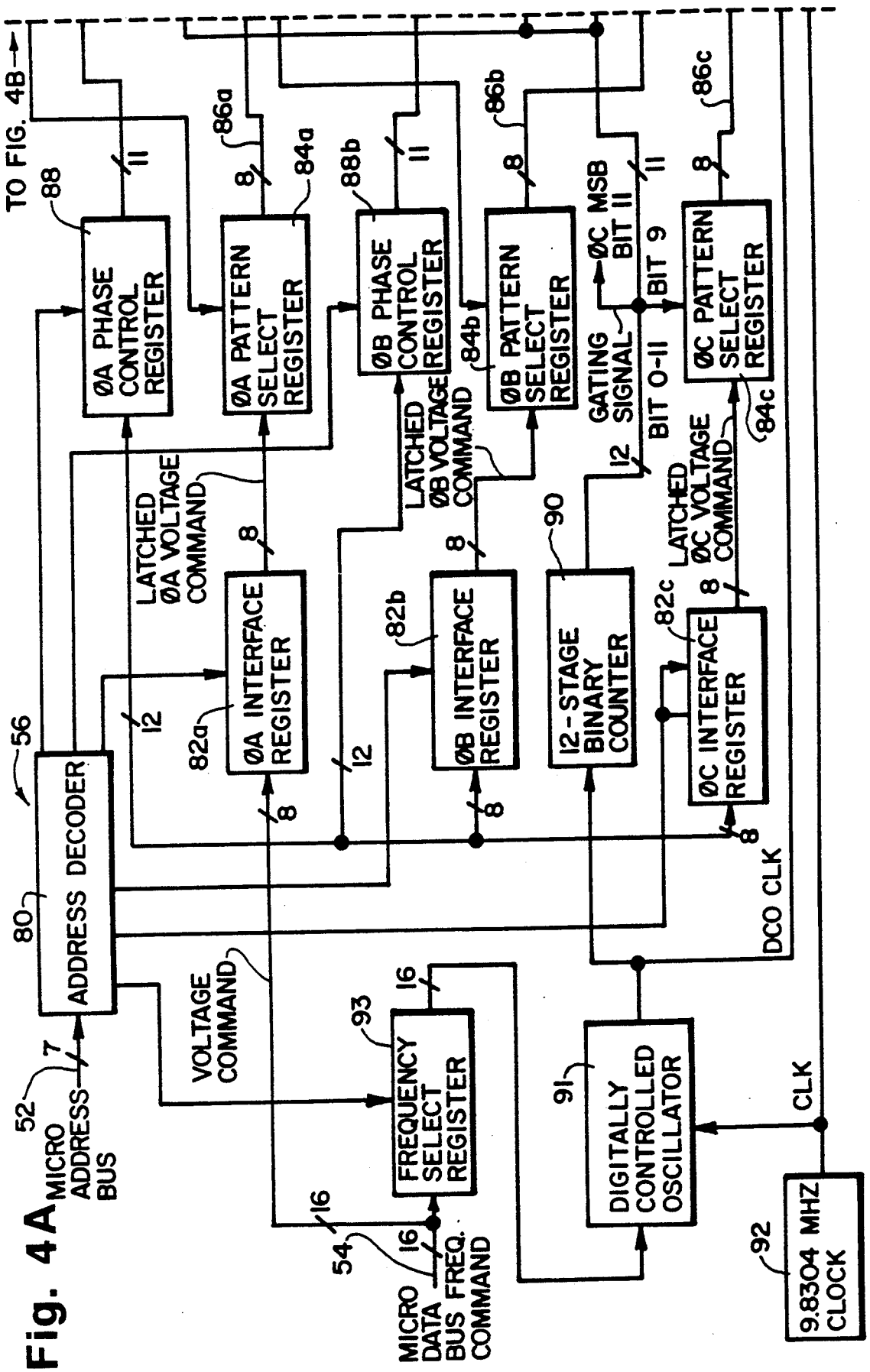

Referring now to FIGS. 4A and 4B, the inverter control 38 according to the present invention is illustrated in greater detail. The lines interconnecting the blocks of FIGS. 4A and 4B include legends designating the number of parallel bits of information which are transmitted over the lines.

The microprocessor 50 transmits seven-bit words over the address bus 52 which are decoded by an address decoder 80 to provide latch control signals to first through third interface registers 82a, 82b and 82c, respectively. When an eight-bit voltage command signal for a particular phase is transmitted over the data bus 54, the address decoder 80 operates the appropriate register 82a–82c so that the voltage command signal is latched thereby. The latched voltage command signals are coupled to phase A, phase B and phase C pattern select registers 84a–84c, respectively, which develop memory addresses on lines 86a–86c representing the PWM waveforms to be produced at the inverter phase A, phase B and phase C outputs, respectively.

The address decoder 80 also provides phase to phase displacement latch control signals developed by the processor 50 on the address bus 52 to phase A and phase B phase control registers 88a and 88b. Each register 88a, 88b latches a twelve-bit phase displacement command signal provided on the data bus 54. The outputs of the phase control registers 88a, 88b comprise a series of words wherein eleven bits of the words from the registers 88a, 88b are provided to first inputs of binary full adders 89a and 89b, respectively. Second inputs of the binary full adders 89a and 89b receive the output of a 12-stage binary counter 90 which counts pulses developed by a digitally controlled oscillator (DC0 91). The DC0 91 receives a clock signal developed by a clock 92 operating at, for example, 9.8304 megahertz and a 16-bit output of a frequency select register 93 which latches the frequency command signals from the data bus 54 under control of the address decoder 80. The DCO 91 is described in greater detail in Recker et al., application Serial No. 07/442,899, filed Nov. 29, 1989, entitled "Digitally Controlled Oscillator" and assigned to the assignee of the present application (Sundstrand Docket No. B03172-AT1-USA), the disclosure of which is hereby incorporated by reference herein. The counter 90 develops a series of twelve bits wherein the eleven least significant bits thereof are provided to the adders 89a and 89b. The third most significant bit of the twelve is additionally used to latch the phase C pattern select register 84c so as to allow new waveform patterns to be selected from the memory 68 every quarter cycle. The most significant bit of the twelve bits is utilized in a fashion described in detail hereinafter.

The binary full adders 89a and 89b produce eleven-bit outputs and all but the most significant bit of each output are provided to first and second latches 94a and 94b, respectively. In addition, the third most 89a and 89b are used to latch the respective phase pattern select register 84a or 84b. The adder outputs are used together with the most significant bit of the binary counter 90 output in a fashion hereinafter described.

The 10 bits provided to the second inputs of the adders 89a and 89b by the counter 90 are also provided to a first set of inputs of a latch 94c. Each of the latches 94a-94c includes a second set of eight inputs which receive bits developed by the pattern select registers 84a-84c, respectively. The latches 94a-94c include control inputs 95a-95c which receive a latch control signal LC, described in greater detail hereinafter, that is developed by the control logic circuit 60. The latches 94a-94c include 18-bit latched outputs wherein the second and third least significant bits of the outputs of each latch 94a-94c are provided to the control logic circuit 60 and the remaining 16 bits are provided to first through third sixteen-bit tri-state buffers 96a-96c. The buffers 96a-96c are controlled by latch control signals developed by the control logic circuit 60 and outputs of the buffers are coupled to a sixteen-bit address input of the memory 58.

Referring specifically to FIG. 5, the memory 58 includes a plurality of memory blocks, wherein each memory block stores a series of bytes each comprising a number of bits, such as eight, which may be either a zero or a one. A zero represents a first output condition of one of the inverter phases, e.g. a notch, while a one represents a second output condition, such as a pulse. Alternatively, a zero could represent a pulse while a one represents a notch, if desired. The address control 56 accesses a particular memory block identified by the eight most significant bits of the signals provided by the tri-state buffers 96a-96c to the memory 58. In addition, the memory locations within each accessed memory block are sequentially addressed by the eight least significant bits of the signals provided by the buffers 96a-96c to the memory 58 so that the bytes within the block are sequentially provided at an output of the memory. In addition, the control logic 60 sequentially operates the tri-state buffers 96a-96c so that the memory 58 provides N bytes at the memory output during each accessing cycle, where N is equal to the number of phases developed by the inverter. Thus, during each accessing cycle the tri-state buffer 96a is enabled by a signal ABE to provide an address to the memory 58, following which the tri-state buffer 96b is enabled by a signal BBE and the tri-state buffer 96c is enabled by a signal CBE. Following enabling of the tristate buffer 96c, the buffer 96a is again enabled in the next accessing cycle.

This addressing of the memory 58 causes N bytes to be provided at the output of the memory during each accessing cycle. As seen in FIG. 5, each byte includes eight bits in bit positions 0-7. These bytes are provided to a set of data latches 100a-100c each of which includes a latch control input 102a-102c which receives the signal ABE, BBE or CBE, respectively. The signals ABE, BBE and CBE operate the latches 100a, 100b and 100c in sequence as each byte is provided at the output of the memory 58 so that each of the latches 100a-100c holds a different byte provided during the accessing cycle at the end of such cycle. The latches 100a-100c are coupled to inputs of a further set of latches 104a-104c having control inputs 106a-106c which receive the signal LC. The signal LC operates the data latches 104a-104c such that the bytes held by the latches 100a-100c are provided to first through third multiplexers 108a-108c at the end of each accessing cycle. Each multiplexer 108a-108c includes a three-bit control input 110a-110c, respectively, which receives a three-bit selection word identifying particular bits of each byte latched by the data latches 104a-104c. The identified bits of each byte held by the latches 104a-104c are passed to the half cycle control 64 described previously.

The signals ABE, BBE, CBE and LC are developed by a finite state machine 120 which is a part of the control logic circuit 60 and which operates in accordance with the state diagram and state table illustrated in FIGS. 7 and 8, respectively. The three-bit selection words coupled to the control inputs of the multiplexers 108a-108c are developed in part by a set of three latches 122a-122c which latch the two least significant bits of the outputs of the latches 94a-94c. The third bit of each three-bit identifying signal is provided by the least significant bit of the output of the 12 stage binary counter 90.

As seen in FIG. 7, the finite state machine 120 assumes a series of 8 states S0-S7 upon receipt of the rising edge of each pulse developed by the clock 92 until the state S7 is reached. Thereafter, the finite state machine 120 remains in the state S7 until a rising edge of a signal DCO CLK is received from the DCO 91.

The DCO 91 produces an oscillator waveform having an average period determined by the contents of the frequency select register 93. A full description of the operation of the DCO 91 is contained in the Recker et al. patent application incorporated by reference herein.

Referring now to the waveform diagrams of FIG. 6, assume that a DCO CLK pulse is generated at a time $t_0$, in turn causing the finite state machine 120 to assume the state S0. As seen in the state table of FIG. 8, the signal ABE assumes a low state at this time while the signals BBE and CBE remain in a high state. Also, the signal LC changes to the high state and remains in the high state until generation of the next pulse CLK from the clock 92 at a time $t_1$, whereupon the finite state machine 120 switches to the state S1. At this time, the signals DCO CLK and LC assume a low state. During the time that the signal ABE is in a low state between the times $t_0$ and a time $t_2$, the tri-state buffer 96a is enabled to in turn cause addressing of the memory 58 with the phase A address held by the latch 94a. In addition, the latch 100a is operated to latch the byte provided at the output of the memory 58.

Upon generation of a pulse by the clock 92 at a time $t_2$, the finite state machine 120 assumes the state S3, in turn causing the signal ABE to switch to the high state and the signal BBE to switch to the low state. Thus, the tri-state buffer 96a is disabled and the tri-state buffer 96b is enabled so that the memory 58 is accessed by a different address for phase B. This addressing continues until a time t3, whereupon the finite state machine 120 switches from the state S5 to the state S6, causing the signal CBE to assume the low state and the signal BBE to assume the high state. This, in turn, enables the tri-state buffer 96c and disables the tri-state buffer 96b so that the memory is accessed using the address for phase C. Accessing of the memory with the phase C address thereafter continues until a time $t_4$, whereupon the finite state machine 120 switches from the state S7 to the state S0. At this time, the signal LC changes to the high state and the least significant bit of the word developed by the 12-stage binary counter 90 assumes the low state. The high state signal LC causes the latches 104a-104c to latch the outputs of the latches 100a-100c so that the bytes provided at the output of the memory 58 during the accessing cycle between the times $t_0$ and $t_4$ are provided to the inputs of the multiplexers 108a-108c. Between the times $t_0$ and $t_4$, each of the multiplexers 108-108c provides in sequence two bits of the byte held by the respective latch 104a-104c to the half-cycle control 64. These bits are identified by two bits of the three-bit identification signals provided to the control inputs 110a-110c of the multiplexers 108a-108c. This sequencing is effected by the third bit of each identification signal which is the least significant bit of the 12-stage binary counter 90. By using the third bit of each identification signal to sequence the bits from the latches 104a-104c, the phase separation can be controlled at most to two periods of the output of the DCO 91.

As should be evident from the foregoing, each accessing cycle is defined by two periods of the signal developed by the DCO 94. During each accessing cycle, the memory is addressed a total of N distinct times, once for each phase of the inverter.

It should be noted that the access time for each phase is selected to exceed the minimum access time for the memory 58. However, the access times are sufficiently short to permit generation of waveforms at the desired frequency or range of frequencies.

Referring again to FIG. 4B, the half-cycle control 64 receives the most significant bits from the adders 90a and 90b and the 12-stage binary counter 92 and develops the desired 360° three-phase waveforms from the 180° information stored in the memory 58 and the gating signals produced by the address control 56. It should be noted that a different portion of each waveform may be stored in the memory 58, such as a quarter-cycle or a full-cycle, if desired. The half-cycle control 64 is conventional in nature and hence will not be described in detail herein, such circuit being well known to those of ordinary skill in the art.

We claim:

1. An inverter control for developing gating signals for switches in an inverter to produce N phase outputs where N is an integer greater than 1, comprising:
   a single memory which stores bytes each comprising a number of bits;
   means coupled to the memory for developing a series of memory addresses for each phase output, each series of memory addresses defining a phase output waveform to be produced;
   means coupled to the developing means for accessing the memory with a memory address from each series thereof during each of a number of accessing cycles so that N bytes are provided at an output of the memory during each accessing cycle; and
   a demultiplexer coupled to the memory for deriving the gating signals from the bytes provided at the output of the memory.

2. The inverter control of claim 1, wherein the developing means comprises N pattern selection circuits, each associated with a particular phase output and each of which develops a series of memory addresses.

3. The inverter control of claim 2, wherein the accessing means comprises an address multiplexer.

4. The inverter control of claim 1, further including control logic coupled to the accessing means and the demultiplexer wherein the demultiplexer includes a first set of N data latches coupled to the memory, a second set of N data latches coupled to the first set of N data latches and N multiplexers coupled to the second set of N data latches.

5. The inverter control of claim 4, wherein the control logic includes means coupled to the first set of N data latches for operating one of the data latches each time a byte is provided at the memory output whereby all of the data latches of the first set are operated during an accessing cycle such that each holds a different byte provided during the accessing cycle at the end of such cycle.

6. The inverter control of claim 5, wherein the operating means comprises a finite state machine.

7. The inverter control of claim 5, wherein the control logic further includes means for causing the second set of N data latches to latch the bytes held by the first set of data latches at an end of each accessing cycle and means for controlling the multiplexers such that they pass a selected bit of each byte latched by the second set of data latches to the switches during each accessing cycle.

8. The inverter control of claim 7, wherein the means for controlling the multiplexers includes a further set of N data latches coupled between the accessing means and the multiplexers.

9. A method of operating an inverter such that it develops N phase outputs, where N is an integer greater than 1 and wherein the inverter includes switches operated by an inverter control, the inverter control further including a single memory which stores each of a plurality of pulse width modulated (PWM) switch control waveforms as a series of bytes each comprising a series of bits, the method comprising the steps of:
   developing N memory addresses during each of a number of memory accessing cycles, each memory address defining an output condition for one of the N phase outputs;
   accessing the memory with the memory addresses so that N bytes are provided at an output of the memory during each accessing cycle;
   selecting a particular bit of each of the bytes provided at the output of the memory; and
   using the selected bits to operate the inverter switches to produce PWM phase output waveforms.

10. The method of claim 9, including the further step of operating a first set of N data latches coupled to the memory during each accessing cycle so that each latch holds a byte provided at the memory output during such accessing cycle.

11. The method of claim 10, including the further step of operating a second set of N data latches coupled to the first set of data latches at the end of each accessing cycle so that the second set of latches hold the bytes held by the first set of latches.

12. The method of claim 11, wherein the step of selecting includes the step of operating a set of N multiplexers coupled to the second set of data latches whereby one of the bits of each byte held by the second set of data latches is provided to the switches.

* * * * *